United States Patent [19]

Helbig et al.

[11] Patent Number: 4,524,435
[45] Date of Patent: Jun. 18, 1985

[54] METHOD FOR DETERMINING THE DEGREE OF CHANGE OF MATERIAL PROPERTIES OF UNDERGROUND STRATA

[75] Inventors: Klaus Helbig, Zeist, Netherlands; Günther Püsch, Celle, Fed. Rep. of Germany

[73] Assignee: Deutsche Texaco Aktiengesellschaft, Hamburg, Fed. Rep. of Germany

[21] Appl. No.: 108,863

[22] Filed: Dec. 31, 1979

Related U.S. Application Data

[63] Continuation of Ser. No. 879,430, Feb. 21, 1978, abandoned.

[51] Int. Cl.³ .................. G01V 1/00; G01V 1/14; G01V 1/22
[52] U.S. Cl. ..................... 367/41; 367/30; 181/102
[58] Field of Search ......... 367/25, 30, 41, 48, 367/57, 59, 86; 181/102; 364/422

[56] References Cited

U.S. PATENT DOCUMENTS

| | | | |
|---|---|---|---|
| 2,803,305 | 8/1957 | Behning et al. | 367/48 |
| 3,496,531 | 2/1970 | Sullivan et al. | 367/59 |
| 3,586,105 | 6/1971 | Johnson et al. | 166/250 |
| 3,690,164 | 9/1972 | Gabillord et al. | 367/14 |
| 3,739,871 | 6/1973 | Bailey | 166/250 |
| 3,786,409 | 1/1974 | Sorkin | 367/41 |
| 3,909,776 | 9/1975 | Broding et al. | 181/119 |
| 3,921,126 | 11/1975 | Waters | 367/48 |
| 4,009,609 | 3/1977 | Sayer | 367/14 |
| 4,042,910 | 8/1977 | Rietsch | 367/59 |
| 4,104,611 | 8/1978 | Kalder | 367/48 |

OTHER PUBLICATIONS

Dennis et al., "Developments of... Hot Rock", 5/1976, pp. 97–107, Proceedings of the 22nd International Instrumentation Symp., San Diego, Calif.

Primary Examiner—Nelson Moskowitz
Attorney, Agent, or Firm—Robert A. Kulason; Ronald G. Gillespie

[57] ABSTRACT

A method of monitoring underground processes in which changes of material properties of underground strata occur in a limited area, especially in regard to in-situ combustions, gasifications in coal and petroleum deposits, in order to localize and determine the degree of change of material properties of underground strata, includes emitting exactly reproducible time-sequential seismic signals in each geological strata where changes are expected to take place. The signals are recorded in the appropriate geological stratum at one or more positions, or in the same position. The signals are stacked with signals of reverse sign. The magnitude of the difference signals obtained and their propagation time are determined.

6 Claims, 2 Drawing Figures

METHOD FOR DETERMINING THE DEGREE OF CHANGE OF MATERIAL PROPERTIES OF UNDERGROUND STRATA

This is a continuation of application Ser. No. 879,430, filed Feb. 21, 1978, now abandoned.

BACKGROUND OF THE INVENTION

Field of the Invention

The present invention relates to a method of monitoring underground processes and, more particularly, to processes involving a change of material property of underground strata.

SUMMARY OF THE INVENTION

A method of monitoring underground processes in which changes of material properties of underground strata occur in a limited area. The method is particularly appropriate in in-situ combustions, gasifications in coal and petroleum deposits, in order to localize and determine the degree of change of material properties of underground strata. The method includes emitting exactly reproducible time-sequential seismic signals in each geological strata where changes are expected to take place, recording in the appropriate geological stratum said signals at one or more positions, or in the same position, stacking said signals with signals of reverse sign determining the magnitude of the difference signals obtained and their propagation time.

The objects and advantages of the invention will appear more fully hereinafter, from a consideration of the detailed description which follows, taken together with the accompanying drawings wherein one embodiment is illustrated by way of example. It is to be expressly understood, however, that the drawings are for illustrative purposes only and are not to be construed as defining the limits of the invention.

DESCRIPTION OF THE INVENTION

Figure 1A:
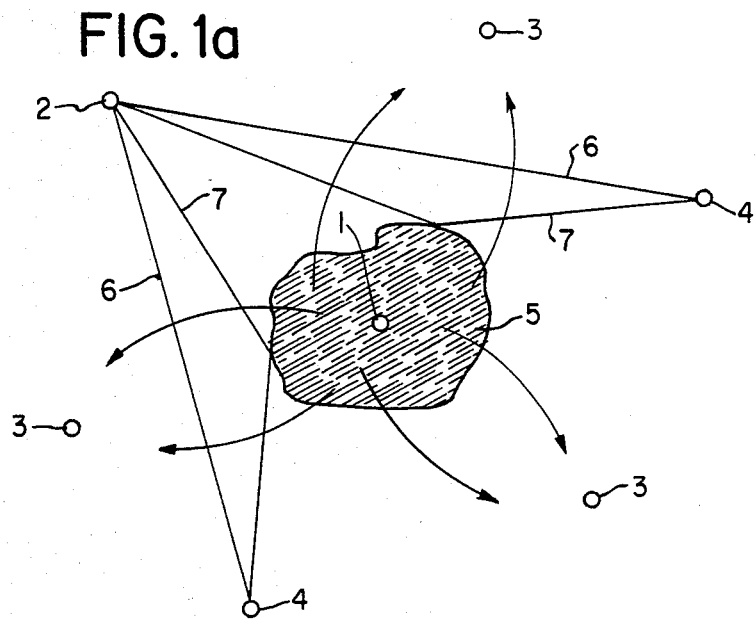
FIGS. 1A and 1B illustrate the method of the present invention, are diagrams of a horizontal section and a vertical section, respectively, of a reservoir.
Figure 1B:
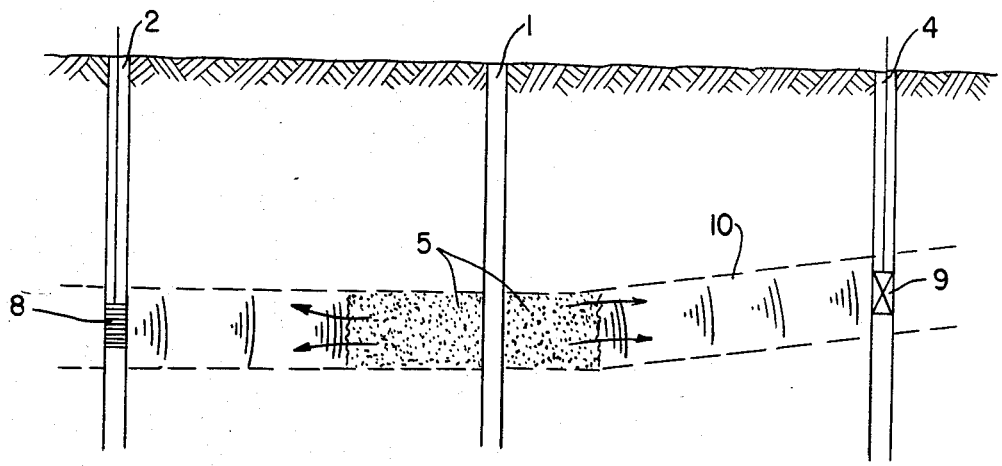

The application on hand relates to a method of monitoring underground processes in which material property changes of underground formations occur within a limited area.

The method allows the determination of the extent of the changed area and the degree of change of the material properties.

The underground processes are especially refer to insitu combustion and gasification processes in petroleum and coal deposits, oil shale, and tar sands. Leaching of salt caverns and mining operations, which cannot be directly observed, have to be monitored.

The principle of underground combustion is based on the change of physical properties which is effected by generating heat in the reservoir, e.g. phase conversion of raw material, so as to improve its flowability or to render the same possible.

Examples of this kind are, crude oil recovery by means of insitu combustion, or sulfur recovery by means of the Frash process. In these processes, the partial combustion is initiated in one part of the reservoir and is maintained by means of an oxygen-containing gas. The process of coal gasification is particularly suited for the recovery of coal at depths below approximately 1000 to 1200 meters, a depth which practically constitutes the limit in conventional mining. According to this method, a coal seam is penetrated by an injection well through which a feedgas is injected thereby effecting a chemical reaction, for example partial combustion, of the feed gas with the coal in the seam. The resultant process gas moves outward through fissures which possibly enlarge during the process itself, towards a number of production wells which, for instance, encircle said injection well. The reaction front divides the coal seam in two parts: In an inner, cylindrically shaped part, in which injection gas and process gas are present and an outer part substantially consisting of the unaffected coal which, however, is fissured. These fissures also contain process gas which propagates towards the production wells.

Large scale tests as well as application on a technical scale render monitoring of the critical process parameters necessary during operation. These parameters include pressure and temperature in the inner area, in particular at the reaction front, and the position of the reaction front. It appears that the inaccessible location and the high temperature in the reaction zone make a direct measurement very difficult. Such process monitoring methods were not previously known. As secondary and tertiary process for oil recovery and coal gasification processes become more and more important with increasing shortage of raw material and energy, there is also a greater demand for observing the performance of these processes which take place in an inaccessible underground strata.

The present level of technology allows information to be obtained on the parameters of the geological strata by way of geophysical measurements, which may be thermal measurements, electrical measurements, or seismic measurements, i.e. recording the noise which occurs during combustion, gas flow, or the enlarging of fissures. They may also concern active measurements where a seismic wave is produced on the earth's surface and the reflections at the combustion front are observed.

Passive seismic measurements can theoretically be used in the determination of the position of the noise source when the instant of receiving one and the same noise at several boreholes can be determined. The difficulty lies in correlating the different noise signals occurring in different boreholes. Therefore, information can only be related to the average intensity of noise development. Active seismic processes, for example, corresponding to the seismic reflection process as developed in petroleum exploration to highest perfection, fundamentally allow the determination of the position of a discontinuity in the material properties, and under favorable conditions, information can be given on the nature of changes of the material properties. The great distance between the combustion front and the surface and the fact that the lateral position of the front is the decisive parameter, do not permit the simple application of methods used in petroleum prospecting to the process monitoring in subterranean processes: The geometric conditions require that the seismic wave source and the positions of observation for the seismic wave at the geological strata level be distributed to one or more boreholes. This requirement restricts the kind of excitation of seismic waves and also the amplitude of the exciter wave, since the integrity of borehole and deposit must be maintained during measurement. Another difficulty is that the area enclosed by the reaction front must be determined by the time the front from the source of the front is only a few meters away from the origin where it started. As the geometric dimension of the changed area must be of the same order of magnitude as the average wave length of the emitted signal, this requires the use of wave lengths preferably of the order of magnitude of about 1 to 20 meters. A further difficulty is that the relatively small reaction area will essentially diffract and scatter the seismic waves and reflect them to only a small extent. The receiver used must therefore be capable of recording very weak signals. By using the known seismic reflection method a method was found whereby each geological stratum in which changes are expected, precise, reproducible time-seismic signals are emitted, which are recorded in the same geological stratum, on one or more different positions or, in the same position stacked with signals of reverse sign, and by which the magnitude of the so obtained differential signals and their propagation time are measured.

The reference symbols represent:
1 = ignition and injection well
2 = well in which signals are generated
3 = production wells
4 = well in which signals are recorded
5 = section of changed material properties (reaction zone)
6,7 = signal paths
8 = signal source
9 = signal receiver
10 = geological stratum Preferably, the signals are composed of a number of weak identical single signals which, subsequent to being received, are stacked so as to provide a summation signal. Minimum discernible signals are to be emitted to prevent a change of the geological stratum 10, i.e. the induced mechanical stress must remain below the load limit of the stratum. It is thus suggested—in contrast to conventional practice—to use an interference process whereby the seismic wave field is firstly observed before ignition in the reaction zone (5) and then after ignition. General changes in the wave area are determined by way of later measurements. In this instance, it is not decisive whether these changes are determined in relation to the conditions before ignition or after, but one may expect that the changes in relation to condition before ignition to be more significant than after ignition, thus rendering their determination easier.

Seismic interference measurements, i.e. the exact comparison, for instance, by subtracting, i.e. stacking with reversed signs, two seismic recordings with very slight changes of wave propagation conditions with the aim of determining these changes, were previously not known. Such an interference measurement requires that the waves to be compared are generated in exactly the same way as otherwise changes of the wave field can no longer be correctly related to the changes in the reaction zone (5). It is therefore imperative to maintain the highest possible signal stability at source.

The absence of interference is also necessary for a successful utilization of active seismic methods. However, the noise which was mentioned in discussing the passive seismic methods, is always present and would thus simulate a change in the wave field. It is therefore necessary with this method that the signal-to-noise ratio be considerably improved. To meet the above mentioned requirements, it is suggested that a low-amplitude repetitive signal be used. Basically, these requirements can be met by any repetitive signal when one "stacks" a random number of single observations, preferably in the order of from about 100 to 1000, since the noise due to its statistical nature, increases only with the square root of the number of stacks whereas the strength of the signal increases proportional to the number of stacks.

The preferred solution to the problem is effected by using a vibrator (8) which generates a so-called "sweep". A "sweep" is a signal in accordance with the equation:

$$S(t) = a(t) \cdot \sin(\phi(t))$$

with the function of amplitude $$a(t) = 0 \text{ for } t < t_1, t > t_2; \text{ n } a(t) > 0 \text{ for } t_1 \leq t \leq t_2$$

with the function of phase $$(t), (d^2\phi/dt^2) \neq 0$$

This corresponds to a time-limited sinusoidal wave train $a(t) \sin\omega t$, the term $\omega t$, however, is replaced by the phase function $\phi(t)$. "Instantaneous frequency" is the differntial quotient $d\phi/dt$. It follows from the condition $d^2\phi/dt^2 \neq 0$ that the instantaneous frequency of a sweep is a highly monotonous function, i.e. a function either constantly increasing or constantly decreasing but never has the same value, not even for two directly successive points of time. With the preferred technical solution the instantaneous frequency varies between about 100 Hz and about 1200 Hz in a time interval of from about 1 to 10 seconds. Autocorrelation of the sweep results in the autocorrelation function $$s(\tau) = \int_{-\infty}^{+\infty} S(t) \cdot$$

$S(t-\tau)dt$, which is symmetrical and has a marked maximum for $\tau = 0$. Interfering secondary maxima can be minimized by selecting a suitable amplitude function $a(t)$ and phase function $\phi(t)$. Since the energy in the sweep is proportional to the integral $$\int_{t_1}^{t_2} a^2 dt < a_{max}^2 \cdot (t_2 - t_1),$$

and $a_{max}$ is limited by the load capacities of well 2 and of the traversed rock, it is more favourable to perform the minimizing by selecting $\phi(t)$ alone and by the selection of a constant for $a(t) \; t_{11} < t < t_{22}$ with the closest possible value to $a_{max}$. $t_{11}$ and $t_{22}$ are points of time in the interval $t_1$, $t_2$ such as $t_1 < t_{11} < t_{22} t_2$ $$\frac{t_{11} - t_1}{t_2 - t_1}, \frac{t_2 - t_{22}}{t_2 - t_1} << 1$$

The recorded signals are the stacked sweep signals which arrive at the receiver via different paths (and due to this, with time lag). By cross-correlating the recorded and stacked signals with the emitted sweep, each of the sweep signals corresponding to a distinct path (a certain time of arrival) is contracted in the known manner to the autocorrelation function of the sweep. In this way the signal obtained after cross-correlation could have been received if an impulse had been emitted in the form of an autocorrelation function.

This technique is known in other frequency ranges, for instance, in reflection seismics and radar technology. It application for locating changes of the material properties during recording by way of interference measurement, is relatively new. The signals received are converted preferably in known manner into digital signals and are stored, stacked in an onsite computer and finally cross-correlated with the emitted signals which are also stored in digital form.

The propagation time from signal source (8) via the process zone to receiver (9) depends on the length of paths (6,7) and on the seismic velocity in this line. The significance of the changes to be expected to the wave field, depends—apart from the size and boundary of the changed area and the wave length of the emitted signal—on the magnitude of change of the material properties in the process area and on the gradient of change in the process area.

It is possible to draw one's conclusions from the gradient of change occurring in the wave field with respect to the product of density and propagation velocity of stress waves. Since this product is dependent on the other process parameters, especially on pressure and temperature, there is a possibility of determining more than only the locality or change of process parameters.

It is possible to place two receivers at different depths within the geological stratum in order to record the amount of vertical changes when the said stratum is of greater thickness.

What is claimed is:

1. A method of monitoring underground processes in which changes of material properties of underground strata occur in a limited area, especially in regard to in-situ combustions, gasifications in coal and petroleum deposits, in order to localize and determine the degree of change of material properties of underground strata, comprising the steps of:

emitting an exactly reproducible time-sequential seismic signal at different times in each geological stratum where changes are expected to take place, receiving in the appropriate geological stratum said signals for each emitting step at one or more positions, recording the received signals, reversing the polarity sign of the recorded signals so as to provide another record of signals of reverse sign, stacking the records of said received signals derived from one emitting step with the records of the signals of reverse sign derived from another emitting step to provide composite records, and determining the magnitude of the difference signals of the composite records and the propagation time of the received signals.

2. A method as claimed in claim 1, characterized by using as the signal source a borehole vibrator which emits signals being substantially sinusoidal with an instantaneous frequency varying highly monotonically between upper and lower frequencies within a period of time, recording the emitted signals, and cross-correlating the records of the received signals with the records of the emitted signals to derive the propagation times of the emitted signals.

3. Method as claimed in claim 1 or 2, wherein the signals to be emitted are present as digital time series which are, prior to emittance, converted into the analog form, and said received signals are reconverted into the digital form immediately after being received.

4. A method as described in claim 2 further comprising the step of cross-correlating a summation signal, resulting from the stacking of the received signals, with the emitted signal.

5. A method of monitoring underground processes in which changes of material properties of underground strata occur in a limited area, especially in regard to in-situ combustions, gasifications in coal and petroleum deposits, in order to localize and determine the degree of change of material properties of underground strata, comprising the steps of:

emitting an exactly reproducible time-sequential seismic signal at different times in each geological stratum where changes are expected to take place, receiving in the appropriate geological stratum said signals for each emitting step at one or more positions, recording said received signals, reversing the polarity sign of the recorded signals to provide another record of signals of reverse sign, and stacking the record of said received signals derived from one emitting step with the record of the signals of reverse sign derived from another emitting step to provide composite records representative of the changes of material properties of the underground strata.

6. A method as claimed in claim 2, wherein the signals to be emitted are present as digital time series which are, prior to emittance, converted into the analog form, and said received signals are reconverted into the digital form immediately after being received.

* * * * *